Feb. 4, 1936.  C. A. HILL  2,029,424

PIPE

Filed Sept. 16, 1933  2 Sheets-Sheet 1

INVENTOR
Charles A. Hill,

Delos G. Haynes,
Attorney.

Feb. 4, 1936.  C. A. HILL  2,029,424
PIPE
Filed Sept. 16, 1933  2 Sheets-Sheet 2
FIG. 7.
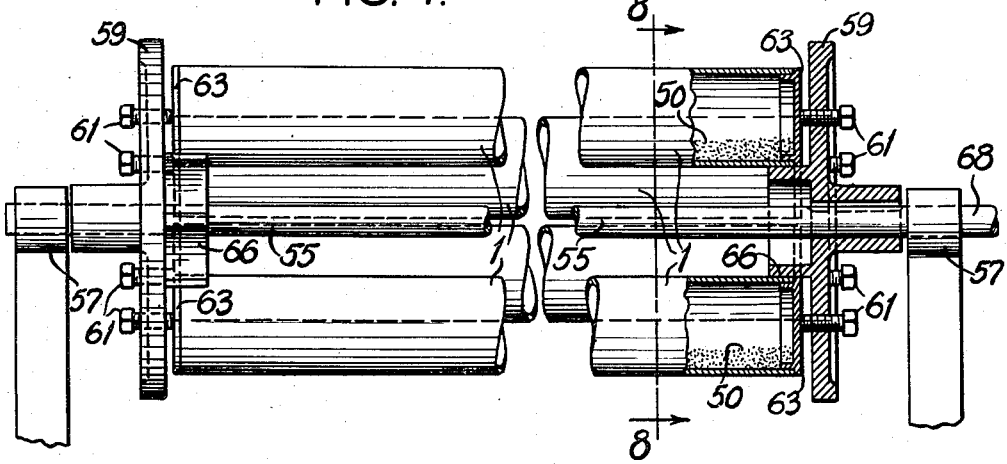
FIG. 8.
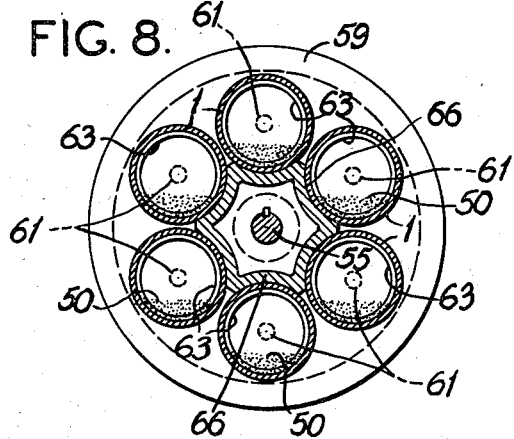
FIG. 10.
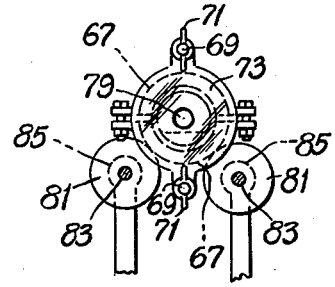
FIG. 9.
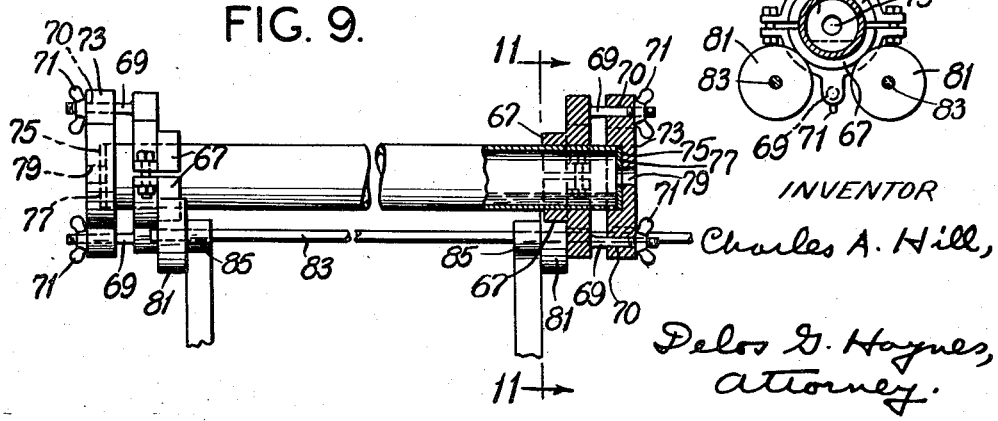
FIG. 11.
INVENTOR
Charles A. Hill,
Delos G. Haynes,
Attorney.

Patented Feb. 4, 1936

2,029,424

UNITED STATES PATENT OFFICE 2,029,424

PIPE

Charles A. Hill, Port Huron, Mich., assignor to Mueller Brass Co., Port Huron, Mich., a corporation of Michigan Application September 16, 1933, Serial No. 689,740

1 Claim. (Cl. 138—47)

This invention relates to pipe.

The principal object of the invention is to provide an economical and effective pipe of increased capacity, and reduced friction, for carrying liquids.

The invention accordingly comprises the elements and combinations of elements, and features of construction, which will be exemplified in the pipes hereinafter described and the scope of the application of which will be indicated in the following claims.

In the accompanying drawings, in which are illustrated several of various possible ways of manufacturing this invention, Fig. 1 is a diagrammatic side elevation showing one method of manufacturing the invention;

Similar reference characters indicate corresponding parts throughout the several views of the drawings.

I have found that some classes of pipe, such as copper and brass pipe and the like, having smooth interior surfaces produced by the usual manufacturing process of piercing, drawing, or extrusion, do not have as high a capacity for transmitting liquids as pipe which is less smooth on the inside. The explanation appears to be that very smooth pipe prevents the liquid from wetting the surface of the pipe, thus forming globules which in moving along the surface, effect increased friction; whereas if the surface is made rough to a certain degree, the fluid wets the surface and the globules therefore do not exist. Under the latter conditions, the capacity of a pipe for carrying liquids and the like is increased.

Apparently, the best roughening is accomplished by effecting a satin-like finish. Several ways of obtaining such finish or analogous finishes on a commercial scale, will now be described.

Figure 1:
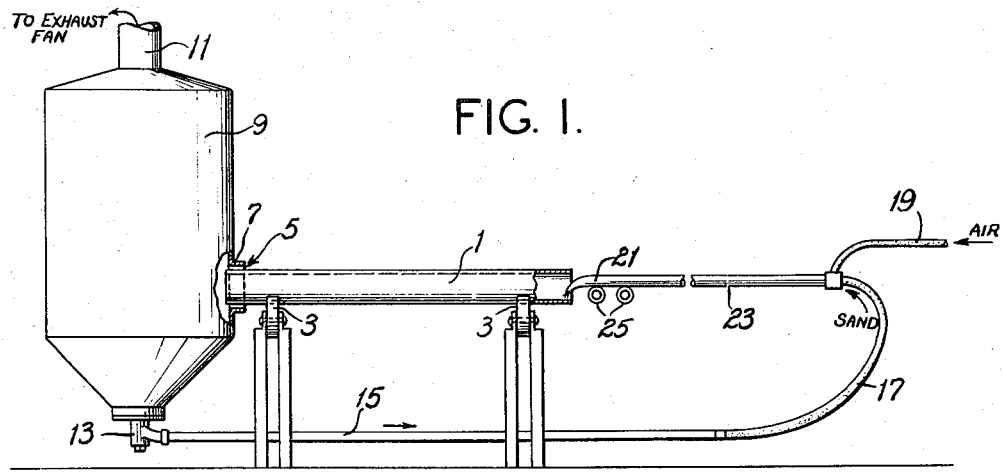

Referring now more particularly to Fig. 1, there is shown at numeral 1, a length of pipe, the interior of which it is desired to roughen. In order to do this, the pipe 1 is mounted on trunnion rollers 3 which permit of rotating the pipe. One end 5 of the pipe is caused to extend into an opening 7 of a sand-receiving chamber 9 having an exhaust fan connection 11. This chamber 9 is of the type wherein air is exhausted without also drawing out the material which comes in with the air. In other words, the tank 9 comprises a separator, as well as a sump for the material drawn out of the pipe 1. It will be clear from the above that the chamber 9 carries reduced pressure.

At the base of the tank 9 is a sand-receiving connection 13 and an outlet line 15, the end of which is attached to a flexible hose 17. Air is brought to the apparatus through a hose 19. An air-sand mixing nozzle 21 having a relatively long reach 23, permitting of feeding the nozzle 21 through the pipe 1, is mounted upon rollers 25. Sand is placed in the vessel 9 and air turned into the pipe 19. The nozzle 21 is of the known type wherein air draws sand over the lines 15, 17 from the chamber 9 and projects the same out of said nozzle 21. The projection is preferably localized in order to obtain a cutting velocity of sand.

The sand blast nozzle 21 is reciprocated while the pipe 1 is turned and the sand blast thus effects roughening of the interior of pipe 1 and after so doing, is projected into the tank 9. The reduced pressure in the tank 9 caused by the suction connection 11 causes the sand to be drawn through the pipe 1. It will be noted that not only is the direct blast action of the nozzle 21 taken advantage of, but the sweeping action of the particles in passing through the pipe, tend to effect a roughened surface on the interior. When the operation is completed, the pipe 23 is withdrawn from the pipe 1 after turning off the blast, and the pipe 1 is removed from the trunnion wheels 3. The apparatus is then ready for the sand blasting of the next unit. It will be understood that other abrasives besides sand may be used.

Figure 2:
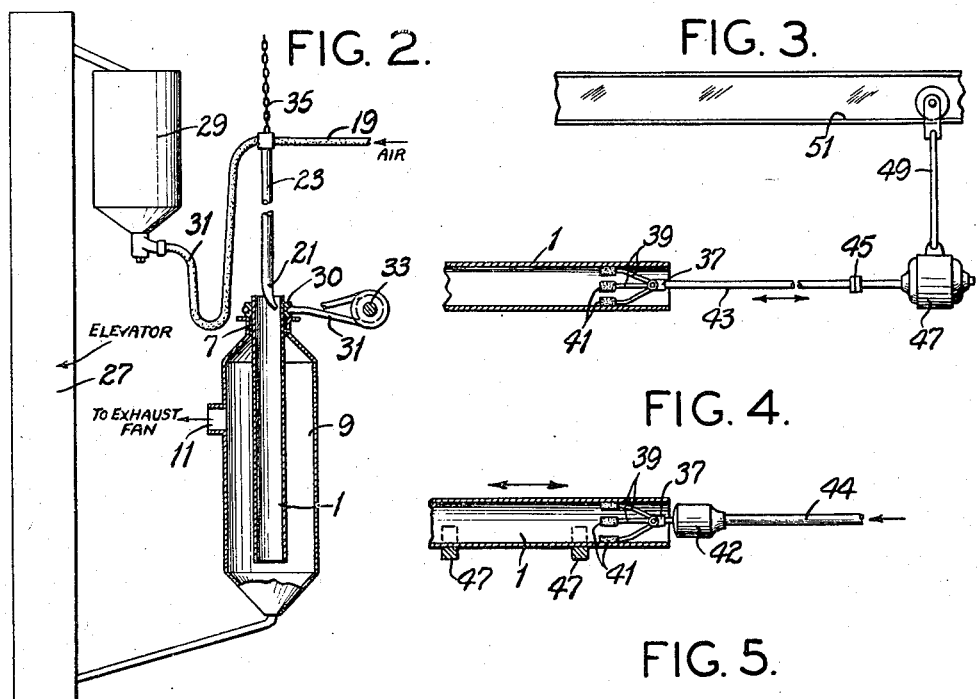
Fig. 2 shows a modification wherein the parts are arranged vertically.

In Fig. 2 is shown a modification of the apparatus shown in Fig. 1, wherein the container 9 is arranged vertically and the gravity sand pipe 15 connected to an elevator 27 which delivers the used sand to an auxiliary elevated container 29. From the container 29 the sand is drawn over a pipe 31 by air which is brought in through the line 19. The pipe 1 is held within a chuck 30 which is driven by a belt or the like 31 from a power source 33. The nozzle 21 and associated part 23 are held on a suspension device 35, by means of the lowering and elevating of which, the nozzle may be lowered or elevated through the pipe 1 while the latter is rotating. The apparatus shown in Fig. 2 is desirable where more headroom than floorroom is available.

Figure 3:
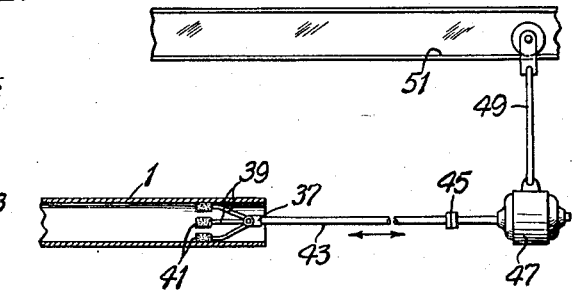
Figs. 3 to 6 show related modifications of a second method of manufacturing the invention; and, Figs. 7 to 11 show other related modifications of a third method.

Figs. 3 to 6 show various ways in which another form of the apparatus is carried out. Referring to Fig. 3, the pipe 1 to be roughened is entered by a head 37 having thereon hinged arms 39 carrying cutters or knurls 41 which, when the head 37 is rotated, are centrifugally forced against the inner wall of the pipe 1. The head 37 is rotated by means of a shaft 43 coupled at 45 with a motor 47, the latter being suspended on a trolley 49 which rides on a track 51. To operate this form of the apparatus, the pipe 1 is positioned and the head 37 is entered therein with the cutters 41. The motor 47 is then turned on and the cutters 41 advance as they rotate centrifugally against the inner surfaces of the pipe. The advance is made by moving the motor 47 on its trolley. It is clear that relative motion between the pipe 1 and head 37 may also be effected by moving the pipe and/or the head.

Figure 4:
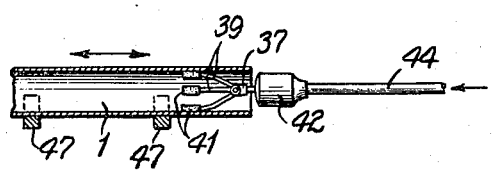

In Fig. 4 is shown the same type of head 37 and, arm 39 and cutters 41 but these are driven by a turbine 42 which may of of the air, steam or water driven type. The energizing fluid is brought in through a line 44 which, in this instance, may be rigid inasmuch as the pipe 1 is moved over the turbine, the pipe 1 being slidably mounted on guide supports 47.

Figure 5:
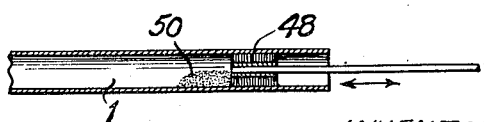

In Fig. 5 is shown a method wherein a rotating brush 48 is sent through the pipe, or the pipe sent over the brush, and a supply of abrasive 50 placed in the pipe while the brush passes therethrough. The brush 48 is preferably of wire or the like which will resist wear. This form is particularly adaptable to small pipe.

Figure 6:
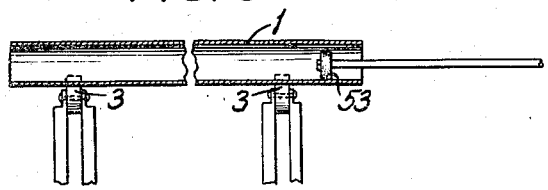

In Fig. 6 is shown a method wherein a grinding wheel 53 is used on the interior surface of the pipe 1 while said pipe 1 is mounted on trunnion wheels 3 and rotated. The grinding wheel is advanced back and forth to the pipe, or the pipe may move with respect to the wheel as the wheel rotates.

In Figs. 7 and 8 is shown a tumbling method of accomplishing the result. An arbor 55 borne on bearings 57 carries head pieces 59. A plurality of pairs of set screws 61 are used in the head pieces to hold caps 63 on the pipes 1 which are to be roughened. The pipes centrally rest in cradles 66 (see Fig. 8) and are held by said caps 63 and set screws 61, after the pipes have been loaded with abrasive material 50. Thereafter, the arbor 55 is rotated by suitable means connected to the end 68, whereupon the tumbling of the material within the pipes causes a refinishing of the inside surface so that it becomes rough or satin-like. After a suitable period of this treatment, the pipes are demounted and are ready for use.

In Figs. 9 to 11 is shown another form of the apparatus wherein the pipe is etched by acid or the like. In this form of the apparatus, pairs of collars 67 are temporarily clamped on and near opposite ends of the pipe 1. These collars are provided with studs 69 having wing nuts 71. The studs 69 pass through openings 70 in circular dams 73 which have recesses 75 for accommodating the ends of the pipe. Gaskets 77 are used to prevent leaking between the ends of the pipe and the bottoms of said recesses 75. The dams are provided with central openings 79. The collars 67 ride upon trunnion wheels 81 which in turn are rotatably mounted on shafts 83 borne in bearings 85.

Enough etching material, such as sulphuric or nitric acid or the like is placed in the pipe after one or both dams are in position. The amount of this fluid is not enough to cause the same to flow out of the opening 79 when the pipe is horizontal. The pipe is then rotated on the trunnion wheels 81, thus causing the acid to be distributed over the entire inner surface of the pipe and to cause the etching action. After the operation is completed, the acid is poured from one or the other of openings 79 and the process repeated on the next pipe. The function for the openings 79 is not only to permit ingress and egress of the acid, but also to prevent an increase in pressure, due to the chemical action between the acid and the material of the pipe.

In view of the above, it will be seen that the object of the invention is achieved and other advantageous results attained.

As many changes could be made in carrying out the above constructions without departing from the scope of the invention, it is intended that all matter contained in the above description as shown in the accompanying drawings shall be interpreted as illustrative and not in a limiting sense.

I claim:

As an article of manufacture, a pipe in which the smooth inner surface produced by the process of piercing, drawing, or extrusion, has been treated by an abrasive to produce irregularities throughout the entire inner surface thereof, for retaining a film of liquid on the interior surface of said pipe, thereby reducing the coefficient of friction between the wall of the pipe and the mass of moving liquid.

CHARLES A. HILL.